United States Patent Office 3,149,673
Patented Sept. 22, 1964

3,149,673
USE OF SOLID POLYOLEFIN PROPPING AGENT IN HYDRAULIC FRACTURING
Benjamin F. Pennington, Woodsboro, Tex., assignor, by mesne assignments, to Jersey Production Research Company, Tulsa, Okla., a corporation of Delaware
No Drawing. Filed Aug. 23, 1961, Ser. No. 133,327
16 Claims. (Cl. 166—42)

The present invention is directed to hydraulic fracturing. More particularly, the invention is concerned with hydraulic fracturing of subsurface earth formations employing a propping agent. In its more specific aspects, the invention is concerned with a hydraulic fracturing operation employing a fracturing agent which has sustained load-carrying characteristics.

The present invention may be briefly described as a method for fracturing a subsurface earth formation penetrated by a well in which a formation pierced by the well is fractured and then there is introduced into the formation particles of a solid polyolefin which are deposited in the fractures and maintain them open for subsequent flow of fluid, such as production of hydrocarbons from the fractured formation.

The solid polyolefins employed in the present invention are polymers of olefins having 2 to 8 carbon atoms in the molecule and may suitably be exemplified by polyethylene, polypropylene, ethylene-propylene copolymers, ethylene-butene-1 copolymers, ethylene-pentene-1 copolymers, and the like, having molecular weights in the range from about 10,000 to about 1,000,000. These polymers are produced by polymerization of the corresponding olefins employing the Ziegler type polymerization catalyst which is obtained by at least partially reducing in solution in a diluent a halide of an amphoteric metal selected from Groups IVB, VB, VIB, and VIII of the Periodic System of Elements (see, for example, the Henry D. Hubbard Periodic Chart of the Elements, 1947 Ed. revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer employed in accordance with the present invention, an amphoteric metal halide is reduced in solution in a nonreactive, nonpolar organic diluent in any suitable manner such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and at least partially reduced amphoteric metal halide, is employed as the medium in which olefin polymerization is effected.

The diluent to be employed should be nonreactive, nonpolar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.), gas oil distillate fractions obtained from the catalytic cracking of virgin gas oil feed stocks, Diesel oil, etc. It will be understood that, if desired, mixtures of two or more compatible, miscible diluents may be employed. The diluent should be susbtantially completely free from oxygen, water, and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about −60° to about 400° F., preferably at about room temperature. Higher temperatures may be employed but are generally undesirable in that catalyst decomposition may be encountered. Subatmospheric pressures and pressures up to about 250 atmospheres may be employed in forming the polymer employed in accordance with the present invention. It is generally preferable to employ in the polymerization technique a comparatively low pressure, and specifically it is desirable to employ atmospheric pressure. Reaction times of about 60 minutes are usually required, although reaction time may vary within the range of about 10 minutes to about 24 hours.

The olefin polymers of the type described and illustrated herein are produced by a catalyst of the nature described and having molecular weights as recited which are essentially insoluble in the nonpolar organic liquid and form a slurry of polymerized olefins therein.

These polymers are suitably quenched by adding an alcohol, such as methyl alcohol, thereto to deactivate any catalyst; and, thereafter, additional amounts of methyl alcohol are added to precipitate insoluble polymers from the resulting slurry. The polymer particles are separated and recovered from the slurry and then may have added thereto suitable antioxidants and or costabilizers as may be desired. If it is desired to add antioxidants and stabilizers to the polymers, they may be suitably added to the solid polyolefin in a solution of an aromatic hydrocarbon and sprayed over pellets or particles of the polyolefin and the resulting mixture then extruded through a suitable extruding device to form a homogenous mixture.

The additives may be suitably admixed by milling, extrusion, or other suitable mixing to enhance stability of the polyolefin.

The polyolefin polymers may suitably have a particle size within the range from about 3 to about 60 mesh. A particle size which is entirely suitable and may be preferred is in the range from about 10 to about 20 mesh. The polyolefin polymers may be in the form of spherical particles or cylindrical or irregular shaped particles as may be desired.

In employing the solid polyolefin particles in fracturing operations, the polyolefin particles are suitably added to a fracturing liquid which may be a hydrocarbon or may be an aqueous fracturing liquid, such as fresh or salt water. Emulsions containing the solid polyolefin such as oil-in-water, water-in-oil, and oil-in-acid emulsions may also be used. Acidic fluids may be employed as the fracturing liquids also. Generally, the fracturing liquids, which are known to the art, may be employed in the practice of the present invention and may suitably contain various materials for controlling the viscosity and fluid loss thereof. The fracturing liquid may contain polyolefin particles in an amount within the range from about 0.10 to about 7.5 lbs. of polyolefin per gallon of liquid, whether it be an oily or an aqueous liquid. It may be desirable under some circumstances to add materials to the liquid vehicle in which the polyolefin particles are suspended which will maintain the polyolefin particles as a suspension therein.

In practicing the present invention, a subsurface earth formation penetrated by a well may have a suspension of polyolefin particles in a liquid vehicle introduced thereinto under pressure against an exposed formation following which the pressure on the suspension is increased until the breakdown pressure of the formation is achieved which causes fractures, either vertical or horizontal, to extend out from the well bore. The formation of fractures may be indicated by a drop in pump pressure and/or an increase in pump rate. Upon parting the formation, the carrier fluid containing the propping agent is injected into the extending fracture and when injection is stopped, the particles of solid polyolefin maintain the fractures open. Thereafter, the well is placed on production by providing a pressure differential from the formation into the well which is suitably achieved by swabbing or replacing the liquid vehicle in the well with a lighter vehicle. The fracturing liquid will be flushed back into the well ahead of hydrocarbons produced in the well and thus removed therefrom.

liquid suspension is immediately forced into the fractured formation under a sufficiently high pressure to maintain the fractures open. In short, the fracturing liquid may be followed by the liquid suspension of solid polyolefin particles although the fracturing may be performed with the suspension.

The solid polyolefin particles have unique properties in that they do not crush when subjected to the pressures such as existing in fractures in an earth formation in which the particles are lodged. Heretofore, it has been the practice to employ granular material, such as sand and nut shells and hulls as well as aluminum spherals to prop the fractures open. These materials may be destroyed or reduced in size and in the case of sand grains may be shattered completely under load and, thus, the effectiveness thereof in a propping action is largely lost.

In order to illustrate the propping characteristics of the solid polyolefins, solid polypropylene was subjected to pressure to demonstrate a propping strength in comparison with other materials, such as Ottawa sand, styrene-alkyd copolymer, walnut hulls, thermosetting resin and aluminum spherals.

The data in the following Table I illustrates the force applied to the particles and the average percent reduction in thickness, as well as observations of the performance of the several materials.

TABLE I

*Comparison of Results of the Relative Propping Strengths of Various Materials Considered for Use in Hydraulic Fracturing*

| Material | Mesh size | Average dimensions, inches | | | Net force applied to particle, lbs. | | | Average percent reduction thickness | Remarks |
|---|---|---|---|---|---|---|---|---|---|
| | | Major | Intermediate | Minor | Max. | Min. | Avg. | | |
| Ottawa sand | 10-20 | 0.0613 | | 0.0448 | 9.7 | 3.6 | 6.3 | [1] 100 | Sand grains shattered completely, leaving virtually no resistance to the load; very fine particles remained. |
| Styrene-Alkyd copolymer | 10-20 | | | 0.0524 | 12.8 | 1.5 | 7.5 | [1] 100 | Particles shattered completely, much the same as sand. Extremely fine particles remained. |
| Walnut hulls | 8-12 | 0.0894 | | 0.0657 | 29.6 | 29.0 | 29.1 | 64.4 | Particles generally cracked into several pieces between 10 and 20 lbs. Pieces remaining will resist load up to a maximum of apparatus. Some fines created, however. |
| Thermoset resin | 10-20 | 0.1028 | | 0.0525 | 29.3 | 15.3 | 26.4 | 62.8 | Particles highly irregular and angular in shape. One particle completely crushed, others resisted full load. One particle did not crush or break. Others broke into several pieces and created fines similar to walnut hulls. |
| Aluminum spherals (Alcoa No. 1300) | 10-20 | 0.0592 | | 0.0505 | 31.0 | 29.5 | 30.0 | 48.12 | Strongest material. Adverse properties—high density (2.7), possible corrosion, does not deform enough for soft formations. |
| Polypropylene spheres | 10-12 | 0.0790 | | 0.0553 | 29.7 | 28.5 | 29.3 | 71.61 | Measurements made unloaded. Actually went above 30 lbs. on several particles. No failure of any kind. |
| Polypropylene elongated cylinders | 10-20 | 0.0969 | 0.0582 | 0.0413 | 29.4 | 28.9 | 29.4 | 60.53 | No failure of any kind. |
| Polypropylene spheres [2] | 10-12 | 0.092 | 0.080 | 0.0599 | 30.2 | 29.2 | 29.7 | 66.28 | Particles apparently increased in weight by 10 percent. This is possible as a result of the heating causing a slightly porous section at the ends of the particles which might physically retain some hydrocarbon. Microscopic investigation indicates the possibility of a porous zone. Note reduction in thickness decreased. |
| Polypropylene elongated cylinders [2] | 10-20 | 0.095 | 0.060 | 0.0411 | 29.5 | 29.2 | 29.4 | 61.31 | No increase in weight. Essentially the same deformation resistance. |

[1] Approximately.
[2] NOTE.—Same material as above after being subjected to 220 F. and 1,000 p.s.i. for 1 week in hydrocarbon condensate.

In practicing the present invention, the formation pierced by the well may be hydraulically fractured using a fracturing liquid, following which a liquid suspension of particles in an aqueous or oily vehicle may be introduced into the well in contact with the formation, following which sufficient pressure is applied to force the suspension into the formation to lodge the particles in the fractures and maintain them open. Thus, the formation may be fractured with a fracturing liquid, such as on oily or aqueous vehicle, an acid gel, or an emulsion, and when a fracture is indicated by a drop in pressure, the It will be noted from Table I that Ottawa sand, which is a common propping agent in hydraulic fracturing operations, shattered completely when sand particles were exposed to pressure and were substantially 100 percent reduced in thickness. The same holds true for the copolymer of styrene and alkyd. The walnut hulls showed more stability, but yet these particles cracked between 10 and 20 lbs. Thermoset resin was crushed, but performed better than the sand and styrene-alkyd copolymers. The aluminum spherals were relatively strong, but showed a reduction in thickness.

By way of contrast, when solid polypropylene particles, such as spheres or cylinders, were exposed to comparable pressure, the particles did not shatter, crack, or create fine particles and no failures were observed. Even after the polypropylene had been subjected to hydrocarbons at elevated temperatures for one week, the polypropylene particles still performed satisfactorily.

It is to be pointed out that although the aluminum spherals suffered less reduction in size than the other materials, aluminum spherals may be unsatisfactory in that this material has adverse properties which limit its use in that the spherals are insufficiently deformable in soft formations. Furthermore, aluminum is readily attacked by acid and alkaline reagents (sodium hydroxide and the like) which are frequently used in well treatments. High temperatures encountered in wells enhance the attack on aluminum. Also, a galvanic cell of aluminum, salt water and steel may result by introduction of the aluminum particles into an earth formation. Moreover, these materials have a high density and an extremely high cost.

The polyolefins, on the other hand, such as polypropylene, have a specific gravity of about 0.91 and are relatively cheap compared to material such as aluminum and walnut hulls. In short, the polyolefin, such as polypropylene, does not shatter and thus maintains fractures open and, therefore, allows the obtaining of useful results in hydraulic fracturing operations.

While the present invention has been described and illustrated by reference to employment of solid polyolefins of alpha olefins having 2 to 8 carbon atoms in the molecule, the invention is also applicable to other solid polyolefins, such as polystyrene and the like.

Other thermoplastic materials besides the polyolefins illustrated may also be used in the form of particles. These materials include, by way of illustration, thermoplastic polymers such as polyvinyl chloride, polyvinylidine dinitrile, poly-2-methyl-butene-1, and the like, as well as molding grade nylon and other materials of a similar nature or characteristics. These materials are given by way of illustration only and not by way of limitation. However, polyolefins such as polypropylene of the thermoplastic polymers are preferred.

It is to be emphasized that other polymers are unsuitable. As shown by the several examples, styrene-alkyd copolymers and thermoset resin proved unsuitable in that these materials shattered or crushed into fine particles which will not prop fractures open.

A solid polyolefin, whether used in the form of spheres or cylindrical or any shape particles, may be easily handled in a dry or wet condition; thus, the polyolefin particles may be bagged and transported to the well site and then introduced into the fracturing liquid, whether it be an oily or aqueous vehicle. Thus, the polyolefin particles may be introduced into the pump liquid through a hopper and the pumped liquid then introduced into the well through a tubing or casing-tubing annulus and thence into a subsurface earth formation pierced by the well either by perforations in the well casing or in an open hole below the casing. Under some circumstances, it may be desirable, when the suspension is introduced through the tubing, to confine the area which is to be fractured by employing a packer closing the casing-tubing annulus.

The amount of pressure employed in fracturing operations is well-known and is easily determinable from the type of formation and the depth thereof in the well.

The present invention is quite advantageous and useful in that it allows extremely hard formations, such as the limestone and dolomite structures of West Texas, to be fractured and maintained open employing polyolefin particles; whereas, heretofore sand grains employed in this operation may be shattered or may embed in soft formations. Individual sand grains have been found to shatter under 6 to 12 p.s.i. load on a single grain. A uniform layer of Ottawa sand will fail between 3000 to 4000 p.s.i., which pressures may be encountered in fractures.

In relatively soft formations, the sand grains tend to embed in the soft formation and allow the fracture system to heal and thus no channel exists for production of hydrocarbon fluids. Thus, it will be seen in the practice of the present invention, polyolefins are preferred in that in hard formations they do not shatter and in soft formations they tend to resist embedment by deforming and exposing a large surface to withstand the load, thus maintaining fractures in other types of formations open for production of valuable earth fluids such as, but not limited to, oil, gas, hydrocarbons, and the like.

The nature and objects of the present invention having been adequately described and illustrated and the best mode thereof set forth, what I wish to claim as new and useful and secure by Letters Patent is:

1. In a method for fracturing a subsurface earth formation in which sufficient hydraulic pressure is exerted on said formation to fracture same, the improvement which comprises introducing into the resulting fractures particles consisting essentially of solid polyolefin whereby said fractures are maintained open for flow of fluid therethrough.

2. A method in accordance with claim 1 in which the polyolefin is polypropylene.

3. A method in accordance with claim 1 in which the polyolefin is polyethylene.

4. A method in accordance with claim 1 in which the particles have a size within the range from about 3 to about 60 mesh.

5. In a method for fracturing a subsurface earth formation in which sufficient hydraulic pressure is exerted on said formation to fracture same, the improvement which comprises introducing into the resulting fractures particles consisting essentially of solid polyolefin whereby said fractures are maintained open for flow of fluid therethrough, said particles having a size within the range from about 10 to about 20 mesh, said polyolefin being a polymer of an alpha olefin having from 2 to 8 carbon atoms in the molecule.

6. In a method for fracturing a subsurface earth formation in which sufficient hydraulic pressure is exerted on said formation to fracture same, the improvement which comprises introducing into the resulting fractures particles consisting essentially of solid polypropylene having a particle size within the range from about 3 to about 60 mesh whereby said fractures are maintained open for flow of fluid therethrough.

7. In a method for fracturing a subsurface earth formation in which sufficient hydraulic pressure is exerted on said formation to fracture same, the improvement which comprises introducing into the resulting fractures a liquid suspension of particles consisting essentially of a solid polyolefin whereby said fractures are maintained open for flow of fluid therethrough.

8. A method in accordance with claim 7 in which the liquid is a hydrocarbon.

9. A method in accordance with claim 7 in which the liquid is water.

10. A method in accordance with claim 7 in which the liquid is salt water.

11. A method in accordance with claim 7 in which the suspension contains from about 0.10 to about 7.5 pounds of said polyolefin per gallon of liquid.

12. A method for fracturing a subsurface earth formation penetrated by a well which comprises introducing into said well in contact with said formation a suspension of particles consisting essentially of a solid polyolefin in a fracturing liquid, applying sufficient pressure to said suspension to fracture said formation whereby said suspension is introduced into said formation to deposit said particles in the resulting fractures and maintain them open.

13. A method in accordance with claim 12 in which the polyolefin is polypropylene.

14. A method in accordance with claim 12 in which the polyolefin is polyethylene.

15. A method in accordance with claim 12 in which the polyolefin is a polymer of an alpha olefin having 2 to 8 carbon atoms in the molecule.

16. A method for fracturing a subsurface earth formation penetrated by a well which comprises fracturing said formation and then introducing into said well in contact with said fractured formation a liquid suspension of particles consisting essentially of solid polyolefin and applying sufficient pressure to said suspension to force said suspension into said fractured formation to deposit said particles in the resulting fractures and maintain them open.

References Cited in the file of this patent

UNITED STATES PATENTS

| | | |
|---|---|---|
| 2,667,224 | Howard | Jan. 26, 1954 |
| 2,699,212 | Dismukes | Jan. 11, 1955 |
| 2,838,116 | Clark et al. | June 10, 1958 |
| 2,950,247 | McGuire et al. | Aug. 23, 1960 |
| 2,962,095 | Morse | Nov. 29, 1960 |
| 2,965,172 | Da Roza | Dec. 20, 1960 |
| 3,000,442 | Gambill | Sept. 19, 1961 |
| 3,026,938 | Huitt et al. | Mar. 27, 1962 |
| 3,089,542 | Kolodny | May 14, 1963 |